United States Patent

[11] 3,591,949

| [72] | Inventor | William E. Connery<br>Perdido Key, Fla. |
|---|---|---|
| [21] | Appl. No. | 817,016 |
| [22] | Filed | Apr. 17, 1969 |
| [45] | Patented | July 13, 1971 |
| [73] | Assignee | Chisholm-Ryder Company, Inc.<br>Niagara Falls, N.Y. |

[54] FRUIT-HARVESTING MACHINE
17 Claims, 6 Drawing Figs.

| [52] | U.S. Cl. | 56/332 |
|---|---|---|
| [51] | Int. Cl. | A01g 19/08 |
| [50] | Field of Search | 56/332–340, 32 |

[56] References Cited
UNITED STATES PATENTS

| 1,239,343 | 9/1917 | Boig | 56/32 |
|---|---|---|---|
| 1,546,530 | 7/1925 | Akahoshi | 56/334 |
| 2,711,625 | 6/1955 | Bullock | 56/332 |
| 2,775,088 | 12/1956 | Bullock | 56/332 |
| 2,968,907 | 1/1961 | Bernheim et al. | 56/332 |
| 3,365,870 | 1/1968 | Cardinale | 56/334 |

*Primary Examiner*—Russell R. Kinsey
*Attorney*—Sommer, Weber & Gostel

ABSTRACT: A harvesting machine for harvesting products such as oranges, or the like, including a picker head connected by means of an elongated conduit to a collector box, a fan in communication with the collector box for evacuating the box and thus producing a suction in the conduit, an apertured flexible diaphragm on the picker head for providing sealing engagement with the product so as to permit the suction to exert a pulling force on the product, and a twister head including a plurality of resilient fingers mounted thereon, said twister head being mounted on said picker head and being rotated by a motor to cause said fingers to engage the product with a twisting force to thereby provide a combined pulling and twisting force on the product to sever it from the tree.

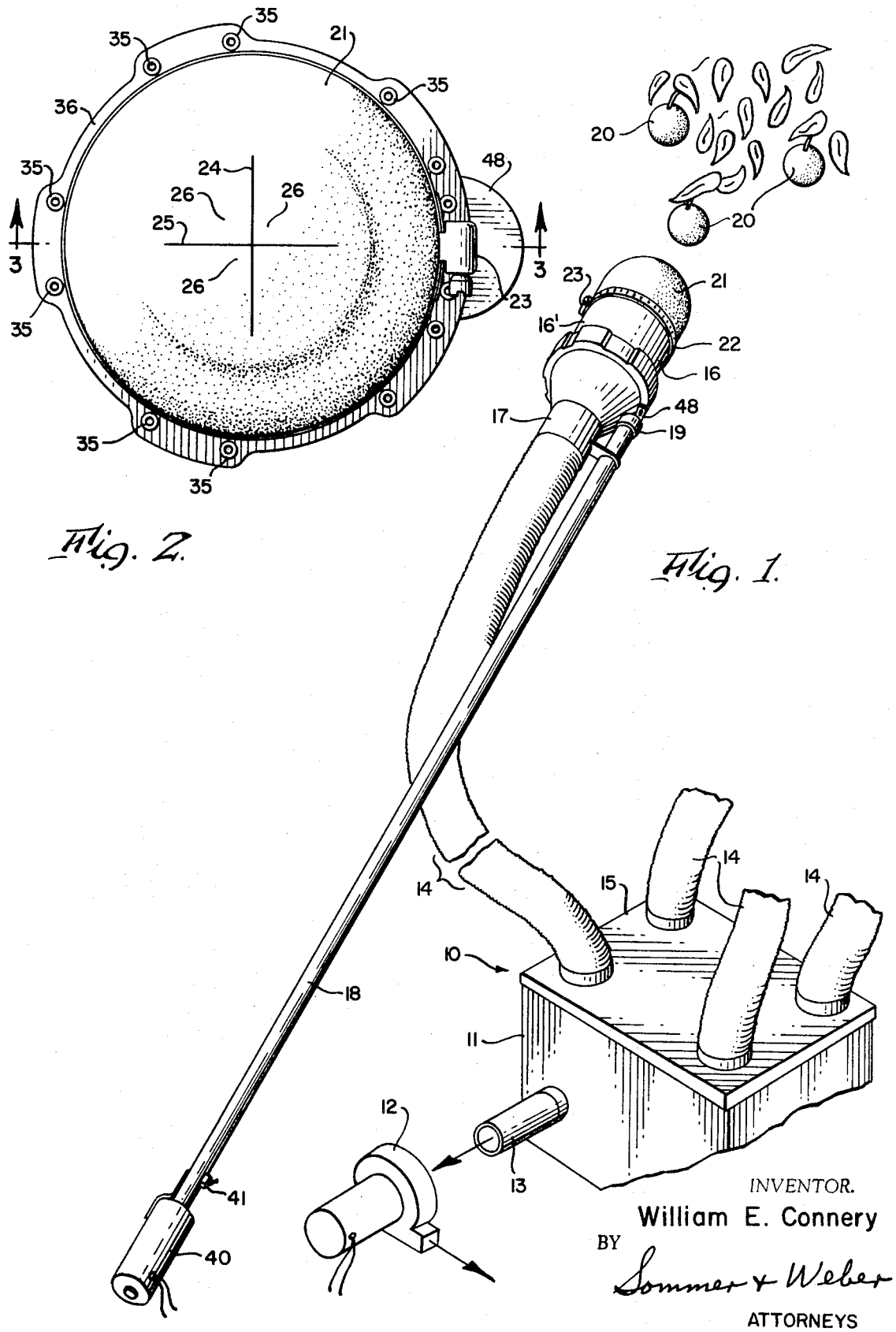

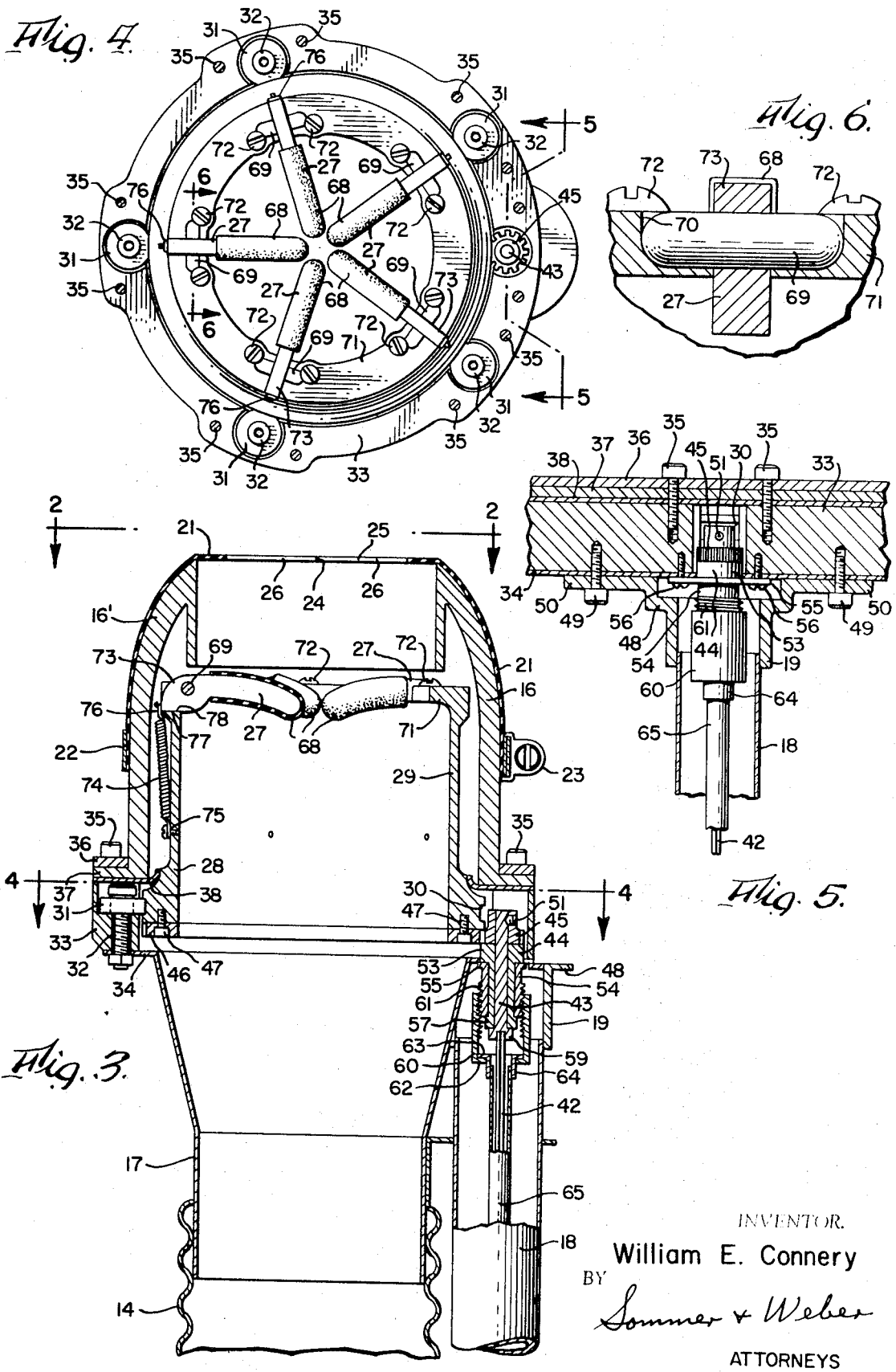

FRUIT-HARVESTING MACHINE

The present invention relates to an improved harvesting machine for picking products such as oranges and the like.

By way of background in the picking or oranges it is necessary to subject the oranges to a combined pulling and twisting force in order to sever the fruit cleanly from its stem. A pulling force, without the accompanying twisting force, will tear the skin of the fruit and thus render it commercially unacceptable. In the past this type of action could not be produced in an expedient manner.

It is accordingly one object of the present invention to provide an improved device for harvesting oranges and the like which exerts a combined pulling and twisting force on the product so as to sever it from its mounting cleanly and efficiently.

Another object of the present invention is to provide an improved harvesting device in which there is a minimum of contact between the product and the device itself so as to minimize bruising of the fruit. Other objects and attendant advantages of the present invention will readily be perceived hereafter.

The improved harvesting device includes a picker head which is in communication with a collector box by means of an elongated conduit. The collector box is evacuated by a fan and this produces a suction in the conduit. The picker head includes first means for engaging the fruit so as to provide a seal therewith and thus permit the suction in the conduit to exert a pulling force on the fruit. Also mounted on the picker head is a rotating twister head which includes means for engaging the fruit while the pulling force is being exerted thereon to impart a twist thereto to sever the fruit from its mounting by a combined pulling and twisting force. The twister head means which engage the fruit include means which permit them to deflect out of the way of the fruit as the suction in the conduit pulls it into the collector box.

The various aspects of the present invention will be more fully understood when the following portions of the specification are read in conjunction with the accompanying drawings wherein:

FIG. 1 is a fragmentary perspective partially exploded view of the improved harvesting device of the present invention;

FIG. 2 is a plan view of the picker head, taken substantially in the direction of arrows 2-2 of FIG. 3;

FIG. 3 is a fragmentary vertical sectional view of the picker head and the twister head mounted therein, taken substantially along line 3-3 of FIG. 2;

FIG. 4 is a horizontal sectional view taken substantially along line 4-4 of FIG. 3 and showing essentially a top plan view of the picker of FIG. 3 with the picking head housing removed;

FIG. 5 is a fragmentary vertical sectional view showing the drive to the twister head, taken substantially along line 5-5 of FIG. 4; and FIG. 6 is an enlarged fragmentary vertical sectional view taken substantially along line 6-6 of FIG. 4 and showing the construction for mounting each of the fingers.

The improved harvesting device 10 of the present invention broadly includes an enclosed collector housing 11 having an exhaust fan 12 in communication therewith through conduit 13, by which air is evacuated from the housing. A plurality of elongated flexible conduits 14 which may be fabricated from corrugated rubber, soft plastic or fabric are suitably attached to cover 15 of collector housing 11 so that the evacuation of the housing produces suction in these conduits. A picker head 16 is nonrotatably connected to the end of each conduit 14 remote from cover 15 by means of a sleeve 17 which is telescopically received within conduit 14 (FIG. 3). A suitable tightening band (not shown) may be used to secure the connection.

An elongated rigid rod 18 has its upper end attached to each picker head 16 by being telescopically received within sleeve 19 secured to said picker head. The lower end of each rod 18 is held by a person for directing the picking head into engagement with the crop to be harvested, which may be the oranges 20. It will be appreciated that one person handles each rod 18. Therefore four people will be associated with collector box 11.

While the following description will be directed toward the harvesting of oranges, it will be appreciated that it can also be used for any type of unitary product, that is, a product which grows as a unit by itself so that each unit has to be picked individually. Thus, the harvesting device of the present invention can be used for other unitary products such as grapefruits, lemons and the like but is not advisable for items such as grapes which grow in clusters.

As noted briefly above, in order to pick an orange 20 the picker head 16 is brought into engagement therewith. In this respect a flexible segmented diaphragm 21 is mounted over the end of picker head housing 16' and is secured thereto by means of an adjustable band clamp 22 having a screw-tightening arrangement 23 thereon. Diaphragm 21, which may be made of rubber or suitable plastic, has two slits 24 and 25 therein which cross each other to provide an opening in the diaphragm. When the diaphragm 21 is brought into engagement with an orange 20, the orange will enter the opening formed by the cross slits 24 and 25, and at this time the flaps or segments 26 adjacent these slits will be flexed but still provide a firm engagement with an orange 20 so as to effect a seal therewith to enable the suction within conduit 14 to exert a pulling force on the orange. It is to be noted that at this initial stage of picking, there is no relative rotation between the diaphragm and the fruit, thereby avoiding any bruising which could occur from this type of contact.

It has been found through experience that fruits such as oranges cannot be picked solely with a pulling force. As they are pulled, they must also be twisted because if they are not, the stem connecting the orange to the tree will not be severed, but instead a portion of the orange skin will be pulled from the orange and thus render it commercially undesirable.

In order to provide a positive twisting force to the orange after it has penetrated the opening in diaphragm 21, it is engaged by a plurality of independently suspended fingers 27 arranged in a radial group and which are pivotally mounted upon rotating twister head 28 located within picker head 16. More specifically, an annular sleevelike member 29 forms a part of twister head 28 and includes an outer track 30 which receives spaced rollers or bearings 31 which are rotatably mounted on bolts 32 secured to ring 33, which is in turn affixed to flange 34 of sleeve 17 by means of said bolts 32. Housing 16' is secured to ring 33 by means of screws 35 which extend through ring 36 which bears on flange 37 of housing 16'. A flexible gasket 38 is interposed between the top of ring 33 and the underside of flange 37 and has a portion which bears against annular member 29 to prevent leaves, twigs and other foreign matter from entering the area where rollers 31 support member 29.

Rotation is imparted to twister head 28 by means of a drive arrangement which includes an electric motor 40 mounted at the lower end of rod 18. This motor can be energized selectively by switch 41 and, if desired, a speed control arrangement may be incorporated relative to the motor so that the optimum twisting speed can be selected for various fruits. A flexible cable 42 (FIG. 3) has one end driven by motor 40 and the other end affixed to shaft 43 which is rotatably mounted in bearing 44 carried by ring 33. A gear 45 is keyed to shaft 43 and is in mesh with a ring gear 46 which is secured to the bottom of annular member 29 by means of screws 47.

In more specific detail the drive arrangement for twister head 28 and the mounting therefor includes the above mentioned sleeve 19 which receives rigid rod 18 (FIG. 5). Sleeve 19 forms a part of bracket 48 which is secured to the housing ring 33 by means of screws 49 extending through ears 50 of said bracket. Gear 45 is secured to shaft 43 by means of setscrew 51. Bearing 44 includes a collar 53 (FIG. 3) against which gear 45 abuts. A sleeve 54 encircles bearing 44 and includes a flange 55 at its upper end having portions which engage both the underside of bearing collar 53 and flange 34 of sleeve 17. Flange 55 (FIGS. 3 and 5) is attached to ring 33 by screws 56 (FIGS. 5). As can readily be seen from FIG. 3, bearing 44 also includes a collar 57 at its lower end which prevents bearing 44 from moving axially in an upward direction relative to sleeve 54 because of the end thrust relationship therebetween. Collar 53 of bearing 44 prevents said bearing from moving axially in a downward direction relative to sleeve 54 because of the end thrust relationship provided by flange 55. The foregoing structure holds gear 45 in position against axial movement relative to housing ring 33 on which it is mounted. Furthermore, shaft 43, which mounts gear 45, is prevented from moving axially in an upward direction in bearing 44 because of the flange 59 thereon which abuts the end of flange 57 of the bearing. A housing 60 is threaded onto threads 61 of bracket 54 and includes a flange 62 which supports flange 63 of sleeve 64 which is attached to the casing 65 of flexible cable 42. By means of the foregoing arrangement, gear 45 is mounted on housing ring 33 for driving engagement with ring gear 46 which is secured to twister housing 29.

As noted briefly above, each of the fingers 27 is independently suspended for pivotal movement on twister housing 29. These fingers engage the orange after it has penetrated the opening in diaphragm 21, while suction is exerted on the orange. Thus, the orange is subjected to a twisting force while the suction is applied thereto to cause the orange to be severed from its stem without having its skin torn. Because each of the fingers 27 is independently suspended the irregularity of the orange will be of no moment in that each of the fingers will be able to engage the orange with the prerequisite force to effect the twisting thereof. Furthermore, since rotation is applied to the orange briefly and only after the application of the pulling force, relative rotation between diaphragm 21 and the orange, which might produce bruising, is held to a minimum.

As can be seen from FIG. 3, each finger has a soft rubber cover 68 thereon so as to minimize blemishing of the orange. Furthermore, each finger is pivotally supported on a pin 69. Each pin 69 is secured in depression 70 of ring 71 at the upper end of annular sleeve 29 by means of screws 72, as best shown in FIGS. 4 and 6. As can best be seen from FIG. 3, each pin 69 extends through the portion 73 at the end of each finger 27. A spring 74 is connected to the radially outer end of each finger, and each spring has one end affixed to the outside of housing 29 at 75 and the other end secured to finger portion 73 at 76. This will bias the left finger 27 in FIG. 3 in a counterclockwise direction about pin 69 and each spring will bias the radially inner end portions of the remaining fingers in a corresponding or upward direction so that the fingers tend to occupy the positions shown in FIG. 3. The upward movement of each finger under the bias of its spring is limited by shoulder 77 on finger portion 73 which abuts the upper rim 78 of sleeve 29.

It can readily be seen therefore that as the fruit passes downwardly into picker head 16 after having passed through the opening in diaphragm 21, it will be engaged by each of the fingers 27 which will each individually deflect against the bias of the spring 74 connected thereto. However, since twister head 28 is caused to rotate by means of the above-described driving arrangement, the fingers 27 will twist the fruit while the diaphragm 21 exerts a sufficiently good seal thereon to permit the suction to exert a pulling force on the fruit. Thus a combined twisting and pulling action is applied to the fruit for severing the fruit from its source without damaging the skin. It will be appreciated that for different fruits the amount of suction may be varied, and the rate of rotation of twister head 29 can be varied, and the strength of springs 74 can likewise be varied, to provide the optimum combination of forces for picking.

What I claim is:

1. A device for harvesting a unitary product comprising an elongated conduit having a first end adapted to be connected with a source of suction and a second end remote from said first end, a picker head mounted on said second end of said elongated conduit, an apertured flexible diaphragm on said picker head for permitting said unitary product to pass therethrough while providing a seal therewith to permit suction in said elongated conduit to be exerted on said unitary product for pulling it, a twister head, means mounting said twister head for rotation proximate said diaphragm, means for rotating said twister head, engaging means on said twister head spaced from said diaphragm for engaging said unitary product for exerting a twisting force thereon in a direction which is transverse to the pull provided by said suction, and biasing means for biasing said engaging means toward said unitary product but permitting said engaging means to deflect out of the path of said unitary product after it is separated from its source so that said suction can pull it through said elongated conduit.

2. A device for harvesting a unitary product as set forth in claim 1 which further comprises a collector housing, said first end of said elongated conduit communicates with said collector housing, air evacuation means communicate with said collector housing for producing a suction therein, and said collector housing is adapted to be connected to a plurality of similar elongated conduits.

3. A device for harvesting a unitary product as set forth in claim 1 wherein said engaging means comprise a plurality of fingers.

4. A device for harvesting a unitary product as set forth in claim 3 wherein each of said fingers is suspended independently of the other of said fingers to permit firm engagement of each of said fingers with an irregularly shaped unitary product.

5. A device for harvesting a unitary product as set forth in claim 1 wherein said picker head is fixedly mounted against rotation relative to said elongated conduit, and wherein said means mounting said twister head mounts said twister head for rotation relative to said picker head.

6. A device for harvesting a unitary product as set forth in claim 5 wherein said engaging means comprises a plurality of fingers.

7. A device for harvesting a unitary product as set forth in claim 5 wherein said diaphragm is located outwardly of said twister head and is nonrotatably mounted thereon so as to engage said unitary product substantially solely with a pulling force prior to the time that said fingers impart a rotation to said unitary product, thereby minimizing relative slippage between said diaphragm and said unitary product.

8. A device for harvesting a unitary product as set forth in claim 7 wherein said diaphragm includes a plurality of segments for providing a seal with said product.

9. A device for harvesting a unitary product as set forth in claim 5 wherein said elongated conduit is flexible, and an elongated rigid member coupled proximate said picker head is provided for directing said picker head into engagement with said unitary product.

10. A device for harvesting a unitary product as set forth in claim 9 wherein said means for rotating said twister head comprises motor means mounted on said rigid member remote from said picker head and a drive connection coupling said motor means and said twister head.

11. A device for harvesting a unitary product as set forth in claim 6 wherein said twister head comprises an annular member having a longitudinal axis, pivot means on said annular member extending transversely to said longitudinal axis, means mounting said fingers on said pivot means, and wherein said biasing means comprises spring means extending between said fingers and said annular member.

12. A device for harvesting a unitary product as set forth in claim 11 wherein said means for mounting said twister head for rotation comprises bearing means on said picker head in engagement with said annular member.

13. A device for harvesting a unitary product as set forth in claim 12 wherein said bearing means comprises a plurality of rollers circumferentially spaced about said annular member.

14. A device for harvesting a unitary product as set forth in claim 11 wherein said means for rotating said twister head comprises a gear ring on said annular member, and gear means in mesh with said gear ring.

15. A device for harvesting a unitary product as set forth in claim 11 wherein said pivot means suspend each of said fingers independently of the other of said finers to permit firm engagement of each of said fingers with an irregularly shaped unitary product, and stop means for limiting the pivotal movement of each of said fingers toward each other under the bias of said spring means.

16. A device for harvesting a unitary product comprising a conduit, suction-operated means for initially pulling a unitary product into said conduit and including openable closure means penetratable by said unitary product while sealingly engaging the same, and mechanical means spaced from said closure means inwardly of said conduit for thereafter exerting a rotary force on said unitary product while such pull is being exerted thereon to produce a combined pulling and twisting effect for severing said unitary product from its mounting.

17. A device for harvesting a unitary product as set forth in claim 16 including means for holding said closure means against relative rotation with respect to said product and means for rotating said mechanical means relative to said closure means, thereby to minimize relative slippage between said closure means and said product.